(12) United States Patent
Nguyen

(10) Patent No.: US 6,219,730 B1
(45) Date of Patent: Apr. 17, 2001

(54) METHOD AND APPARATUS FOR PRODUCING A COMBINED DATA STREAM AND RECOVERING THEREFROM THE RESPECTIVE USER INPUT STREAM AND AT LEAST ONE ADDITIONAL INPUT SIGNAL

(76) Inventor: Nghi Nho Nguyen, 301 Santillo Way, Downingtown, PA (US) 19335

( * ) Notice: Subject to any disclaimer, the term of this patent is extended or adjusted under 35 U.S.C. 154(b) by 0 days.

(21) Appl. No.: 09/100,410

(22) Filed: Jun. 20, 1998

(51) Int. Cl.$^7$ .............................. G09G 5/08; G06F 15/20; G06F 13/00; H03M 7/00; G10L 3/00
(52) U.S. Cl. ........................ 710/62; 710/10; 710/8; 710/63; 710/64; 710/65; 710/73; 345/163; 345/157; 345/328; 341/50; 370/535; 379/202; 379/399
(58) Field of Search ................... 710/100, 8, 9, 710/10, 62, 63, 64, 65, 68, 69, 70, 71, 72, 73; 345/157, 168, 163, 160, 328; 348/6; 341/50; 379/399, 202; 370/535

(56) References Cited

U.S. PATENT DOCUMENTS

| | | |
|---|---|---|
| 4,689,761 | 8/1987 | Yurchenco . |
| 5,020,098 * | 5/1991 | Celli ................................. 379/202 |
| 5,168,556 * | 12/1992 | Lajtai et al. ........................ 710/71 |
| 5,359,712 * | 10/1994 | Cohen et al. ..................... 345/328 |
| 5,387,927 * | 2/1995 | Look et al. ........................... 348/6 |
| 5,402,518 | 3/1995 | Lowery . |
| 5,568,614 * | 10/1996 | Mendelson et al. .............. 709/231 |
| 5,631,669 | 5/1997 | Stobbs et al. . |
| 5,663,962 * | 9/1997 | Caire et al. ....................... 370/535 |
| 5,706,335 * | 1/1998 | Hinderks ........................... 379/399 |
| 5,802,318 * | 9/1998 | Murray et al. ................... 710/100 |
| 5,808,569 * | 9/1998 | Wuppermann et al. ........... 341/50 |
| 5,870,080 * | 2/1999 | Burnett et al. ................... 345/163 |
| 5,877,747 * | 3/1999 | Kitao et al. ....................... 345/160 |
| 5,878,120 * | 3/1999 | O'Mahony ...................... 379/93.09 |
| 5,990,866 * | 11/1999 | Yollin ................................ 345/157 |
| 5,990,872 * | 11/1999 | Jorgenson et al. ............... 345/168 |

OTHER PUBLICATIONS

Gorges et al. "Speech Browsing the World Word Web", Systems, Man, and Cybernetics, 1999, IEEE SMC '99 Conference Proceedings. 1999 IEEE Int. Conf. on, vol. 4, pp. 80–86.*

Severance, C. "Linking Computers and Consumer Electronics", Computer, vol. 20, Issue 2, Feb. 1997, pp. 119–121.*

Nishimoto et al. "Improving Human Interface Drawing Tool Using Speech, Mouse and Key–board", Robot and Human Communication, 1995. RO–MAN'95 Tokyo, Proceedings, pp. 107–112.*

(List continued on next page.)

*Primary Examiner*—Thomas Lee
*Assistant Examiner*—Katharina Schuster

(57) ABSTRACT

An apparatus, functioning as a user-input device (UID) to a computer by using a communication link, receives/transmits additional I/O signals via the same link. The I/O signals may be analog or digital. One implementation of the apparatus, made wireless and supported by speech processing software, allows its user to interact with the computer remotely. The inventive apparatus comprises means for converting the I/O signals into/from the digital I/O streams in such a manner as to be transferable to/from the computer along with the UI information via the same communication link. The apparatus, while functioning as a UID, may handle the I/O signals coming from/to an external I/O device, such as a fax/modem device or even another conventional UID. The apparatus, while performing as a UID, may include the complete functionality of an external I/O device handling the I/O signals. A communication program method, by which a computer receives a combined data stream resulted from two sources, one from a UID another from an additional input signal, recovers from such stream the respective information of the two sources.

25 Claims, 8 Drawing Sheets

OTHER PUBLICATIONS

Vo et al. "Multi–Modal HCL: Combination of Gesture and Speech Recognition", Interact '93 and CHI '93 Conference Companion on Human Factors in Computing Systems, 1993, pp. 69–70.*

Malkewitz et al. "Experiences with Adding New Input Modalities to PC Desktop Computing", Proceedings of the Conference on Designing Interactive Systems, 1997, pp. 235–238.*

Philips Electronics N.V., Product Brochure of Speech Mike, Model LFH6173, Advertised Sep. 1997; Web http://www.speechmike.philips.com.

* cited by examiner

FIG. 1A - PRIOR ART

METHOD AND APPARATUS FOR PRODUCING A COMBINED DATA STREAM AND RECOVERING THEREFROM THE RESPECTIVE USER INPUT STREAM AND AT LEAST ONE ADDITIONAL INPUT SIGNAL

FIELD OF THE INVENTION

This invention relates to computer user-input devices including pointing devices, especially to those handling additional input/output signals.

BACKGROUND OF THE INVENTION

A computer utilizes a user-input device (UID) to receive its user's input and various kinds of input/output (I/O) cards or devices to handle I/O signals or information. A typical UID is the mouse, the trackball, the keyboard, the pressure tablet, or the pen-based input device. Popular I/O cards include the sound card handling I/O speech signals and the fax/modem device transferring information over the telephone line. Devices and cards require and share common computer resources such as the direct memory access (DMA) channels and the interrupt request (IRQ) services. Computer resources for each device or each card equipped in a computer must be configured, or assigned, to pre-arranged memory locations that are limited in number. Configuration setup for computer resources is cumbersome and sometimes causes conflict in running software. The recent plug-and-play technology implemented in computers alleviates the configuration mechanism. However, it does not solve the problem of limited resources shared among cards and devices. As computer technology advances, more types of cards and devices are offered for richer sets of functions; efficient use of computer resources becomes critical. Furthermore, a conventional computer requires that its user be close to its display screen in order to see and control what shown on the screen. If somehow the user could issue commands to her computer and receive its responses remotely, she would gain a new freedom, such as walking around or staying in bed, while using the computer. The present invention offers a new kind of UID utilizing the computer resources efficiently and enabling a mode of remote interaction between the computer and its user.

SUMMARY OF THE INVENTION

An object of the present invention provides an apparatus functioning as a UID to a computer while receiving/transmitting additional I/O signals transferred to/from the computer without using any computer resources except those available to the UID.

Since the inventive apparatus is a UID functioning additionally as an I/O card (or device) without using the card (or device) and its resources, it provides the following advantages. Elimination of the I/O card (or device) reduces the computer parts and resources, thus enhances the computer's reliability, serviceability and efficiency. Such inventive apparatus is useful in hand-held computers or embedded systems, which usually have a communication port needed for a UID but no provision for I/O cards (or devices). When handling two input (or output) signals of the same type, two identical I/O cards cannot be used in one computer due to configuration conflict, but the inventive apparatus cooperating with one such I/O card (or device) can. For example, one inventive apparatus handling the I/O telephone signals effectively functions as a fax/modem device and at the same time as a UID. A computer may use such apparatus in conjunction with another fax/modem card to handle two telephone lines. As another example, a computer may use one inventive apparatus that handles the I/O speech signals to work in conjunction with a sound card in order to deal with two speech inputs and two speech outputs. Such use is essential to computers that need to deal with two sources of speech inputs, say, one as the voiced command and another for multimedia recording. Furthermore, the inventive apparatus that handles the speech I/O signals will be further supported by software interpreting the speech input as voiced commands and generating the speech output as voiced responses. Such apparatus, made cordless and integrated with a microphone and a speaker, will allow the user to interact with the computer remotely. By carrying the apparatus with her, the user may issue oral commands to the computer via the microphone, and hear its responses from the speaker, while being away from the computer.

One object of this invention provides a user-input (UI) apparatus that sends its data to a computer, by using the communication link available to a conventional UID, while receiving/transmitting additional I/O signals, the information of which being transferred to/from the computer via the same communication link. The inventive apparatus comprises means for converting the I/O signals into/from the digital I/O streams in such a manner as to be transferable to/from the computer along with the UI information via the same communication link. The apparatus, while functioning as a UID, may handle I/O signals sent from/to an external I/O device, such as an external fax/modem device or even another conventional UID. Furthermore, there is a program method, executed by the computer and cooperating with the apparatus, for transferring information over the communication link, and for recovering therefrom the UI information and the information of the input signals.

Two examples of communication protocols used by a UID are the popular RS-232 and the newly standardized Universal Serial Bus (USB). The transmission of the communication signals may be wired (via cable) or wireless (via electromagnetic wave). The I/O signals may be analog, such as the speech, or digital, such as the data transferred to/from a computer.

In order to function as a UID, the inventive apparatus utilizes a user-input module as one of its components or alternatively provides interface to an external conventional UID.

Another object of the invention provides an apparatus comprising only the feature of receiving at least one input signal.

The inventive apparatus may integrate means to handle the I/O signals, such as the microphone converting a speech input into the input signal and/or the speaker converting the output signal into speech energy.

The inventive apparatus may be implemented, at least partially, by integrated circuit (IC) technology using such part as the programmable logic device (PLD) or the application-specific IC (ASIC).

The inventive apparatus may be implemented, at least partially, by a microprocessor-based design; furthermore, data compression/decompression algorithms may be used to reduce the data traffic over the communication link.

The inventive apparatus may be powered solely from the signals of the communication link.

Another object of the invention provides a method for receiving a combined data stream, resulted from a UID source and from an input signal, and for recovering therefrom the respective information of the UID and of the input signal.

BRIEF DESCRIPTION OF THE DRAWINGS

In the figures referred below, the like numbers or names denote the like elements.

FIG. 1A shows a computer utilizing a conventional UID and a sound card.

DESCRIPTION OF THE PREFERRED EMBODIMENTS

Figure 1B:
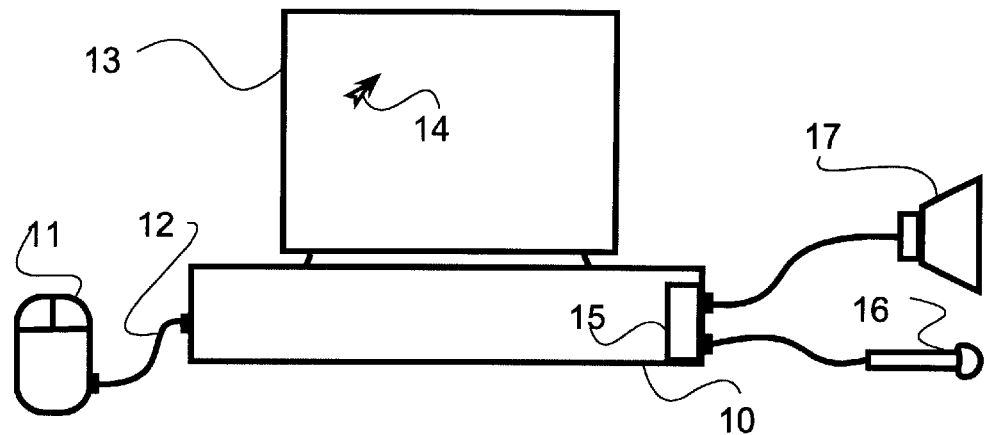
FIG. 1B shows the same computer wherein one embodiment of the invention replaces both the UID and the sound card.
Figure 1B:
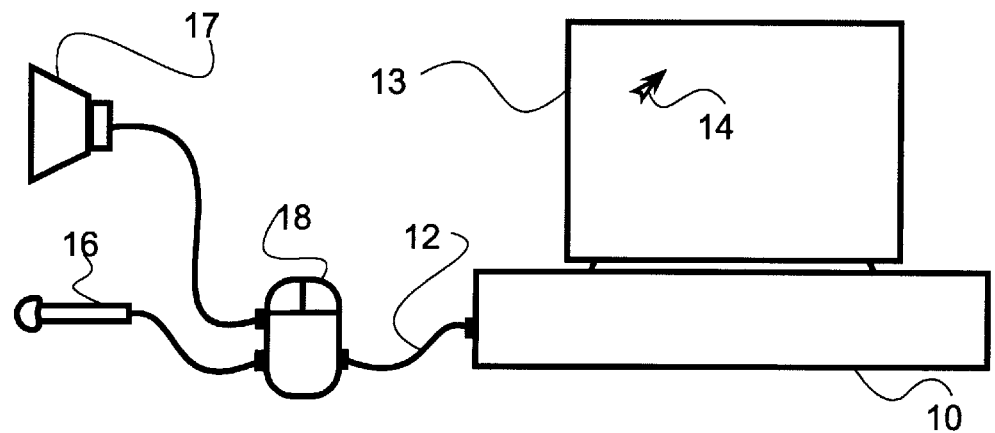

FIG. 1A illustrates a computer system in which computer 10 communicates with UID 11 via communication link 12 to move object 14 displayed on monitor 13, while utilizing sound card 15 to receive speech input from microphone 16 and to transmit speech output to speaker 17. According to one implementation of the present invention, by substituting UID 11 with inventive apparatus 18, as depicted in FIG. 1B and described subsequently, computer 10 eliminates the sound card. Apparatus 18 directly receives speech input from microphone 16 and transmits speech output to speaker 17. When using the computer shown in FIG. 1B, a user operates apparatus 18 normally as a conventional UID and further may speak into the microphone and hear speech output from the speaker. In other words, apparatus 18 singly provides both functions, of a UID and of a sound card, without utilizing the sound card and its computer resources. Apparatus 18 realizes one embodiment of the invention wherein the I/O signals are speech; there are other embodiments which receive/transmit other types of the I/O signals while performing as a UID.

In order to function as a UID, the apparatus offered by this invention either cooperates with an external conventional UID or utilizes a user-input (UI) module. A UI module is a UID without its housing and cable attachment; it can be made or purchased. Examples of commercial UI modules are: the VersaPoint module from Interlink Electronics, 546 Flynn Road, Camarillo, Calif. 93012; the HulaPoint module from USAR Systems, 568 Broadway #405, New York, N.Y. 10012; and the generic modules compatible with the standard serial mouse made by Microsoft, One Microsoft Way, Redmond, Wash. 98052-6399. Functionally, a UID or a UI module comprises a sensor translating a user-initiated actuation into electrical signals, and an encoder converting such signals into a digital stream, called the UI stream, representative of its actuation. The UI stream follows the format of the communication link used by the associated UID. In this description, the UI stream conforms to the Microsoft serial mouse's asynchronous frame format composed of one start-bit, seven data-bits, and one stop-bit, transmitted at 1200 bits/s. The inventive apparatus receives a UI stream coming either from a UI module or from an interface to an external UID.

Figure 2A:
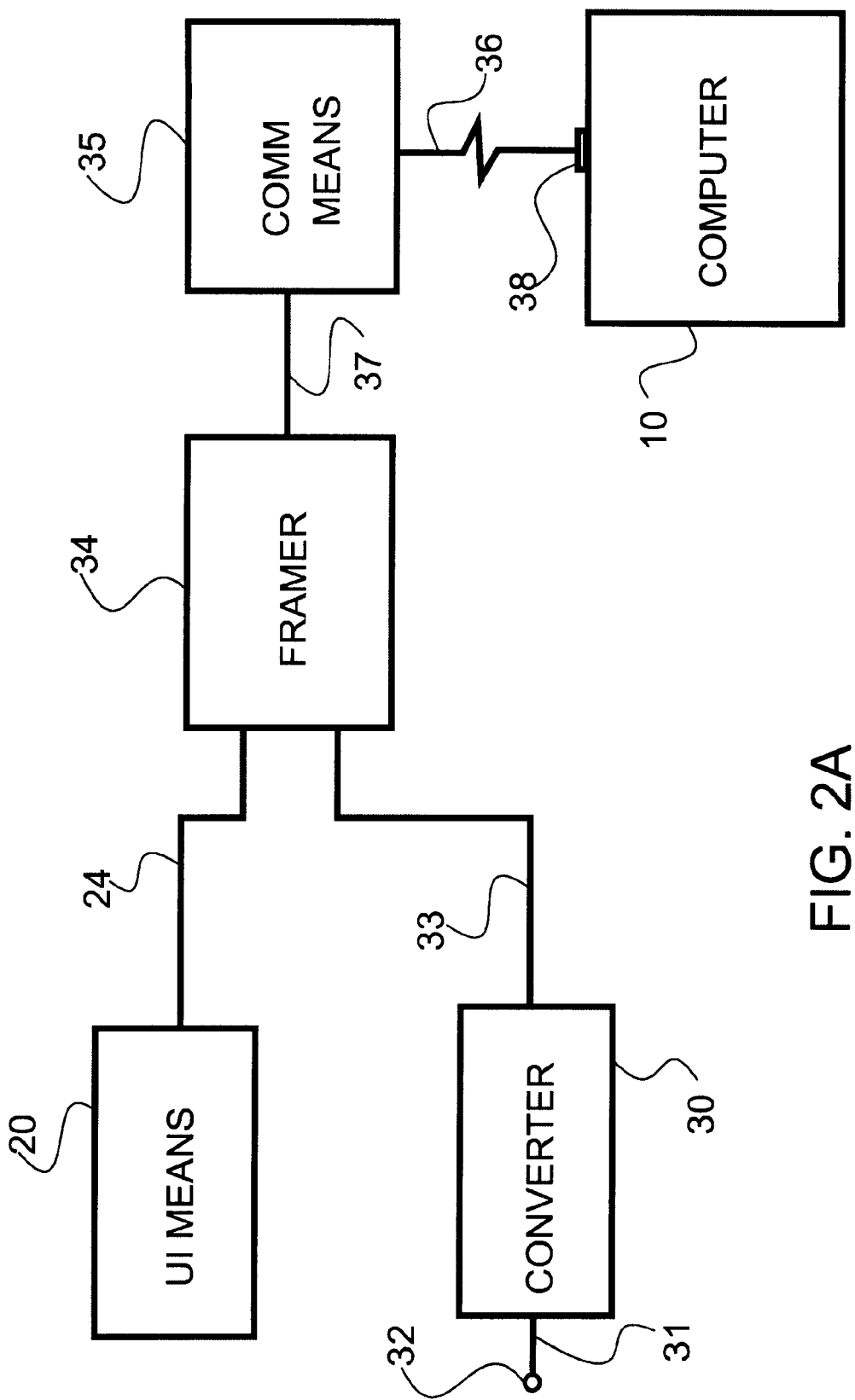
FIGS. 2A, 2B, and 2C show block diagrams of the various embodiments of the invention.
Figure 2B:
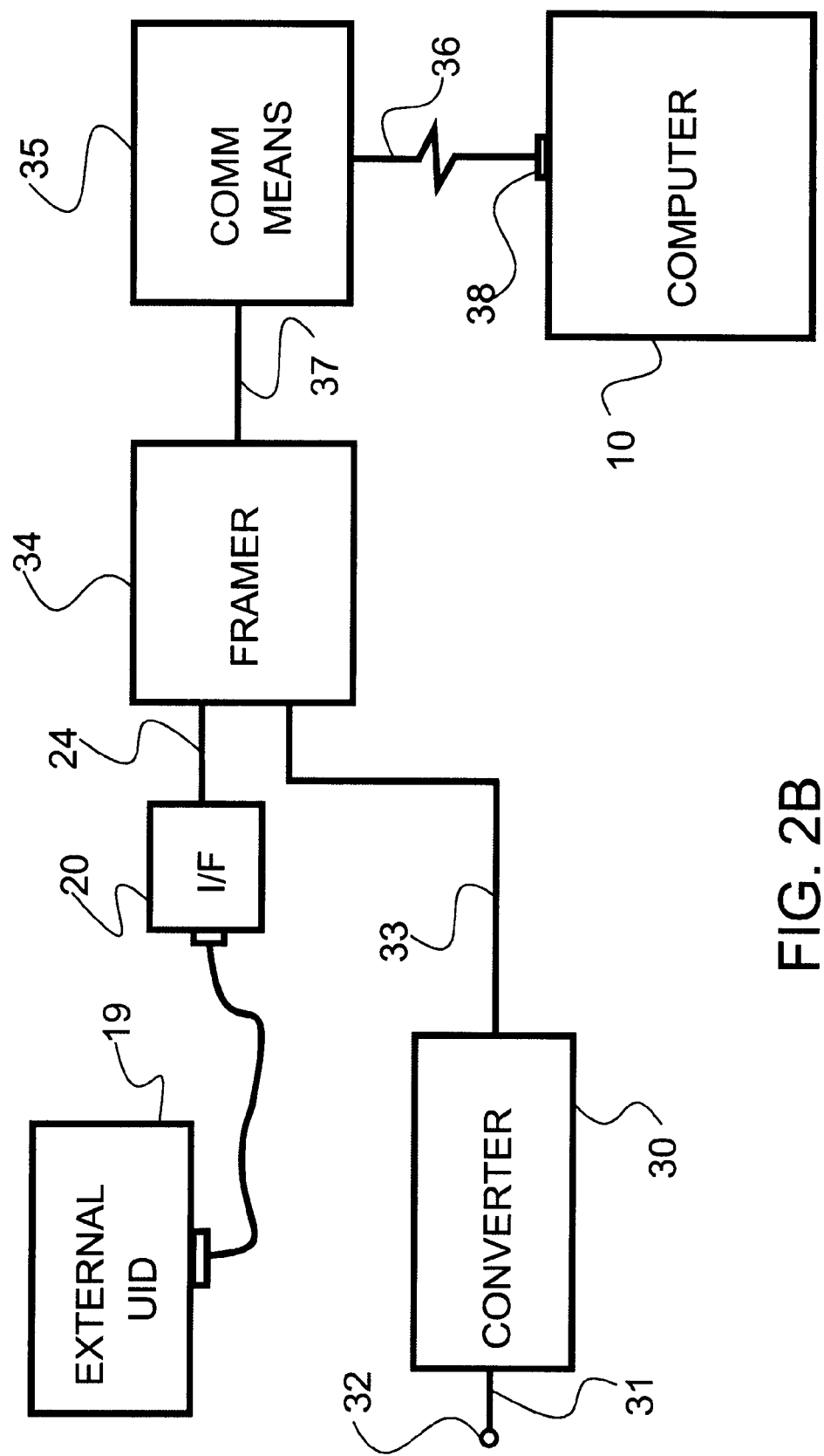
Figure 2C:
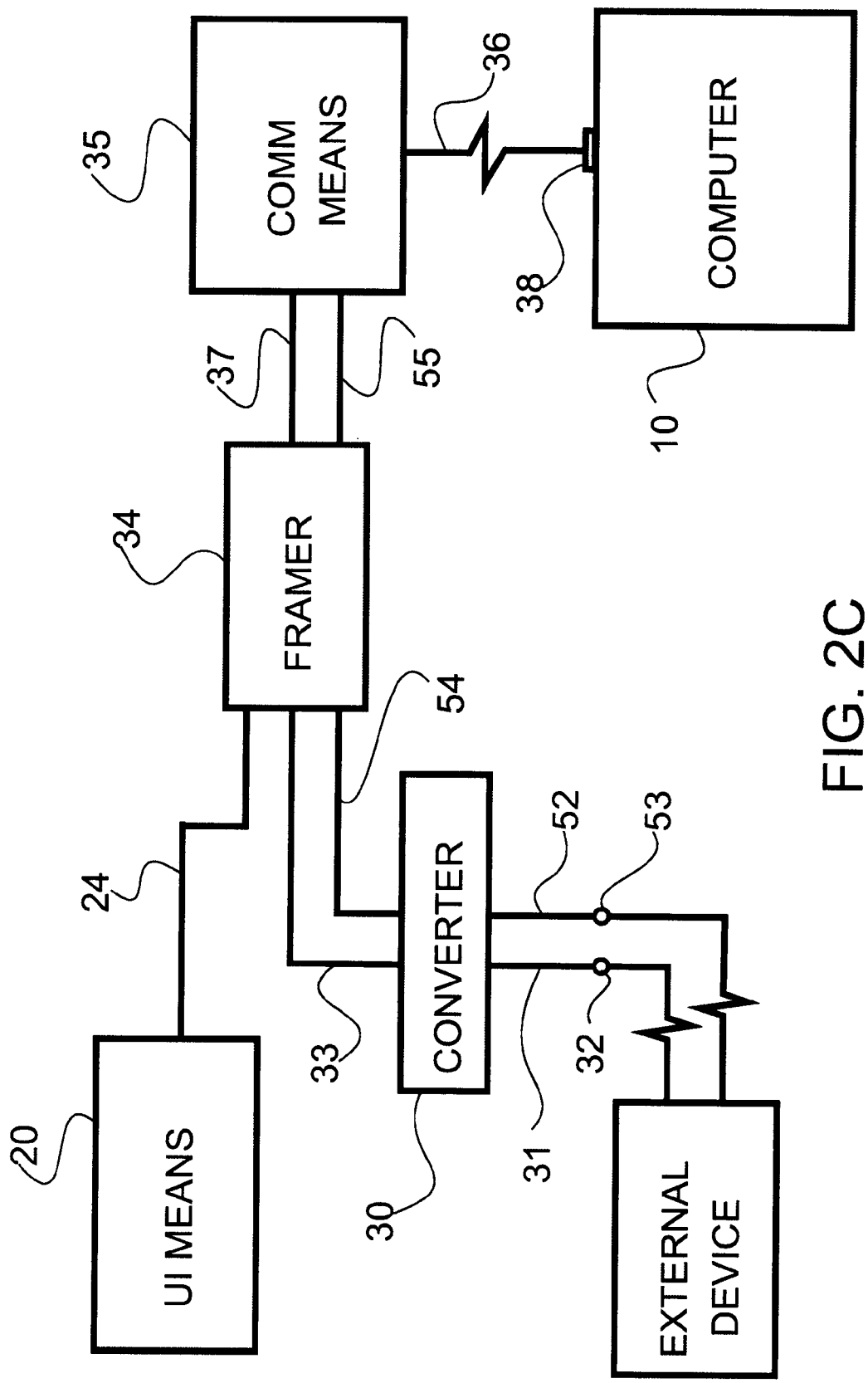

One embodiment of the present invention, having the functional block diagram depicted by FIG. 2A, comprises a UI means 20, a signal converting means called converter 30, a framing logic means called framer 34, and a communication means 35. The same block diagram is shown in FIG. 2B in which an interface to external UID 19 acts as the UI means 20. Another block diagram is shown FIG. 2C in which an external device such as the fax/modem device, transmits/receives I/O signals to/from converter 30 via input 32 and output 53. In reference to FIGS. 2A, 2B, and 2C, UI means 20 produces UI stream 24, while converter 30 converts input signal 31, delivered by input 32, into input stream 33 representative of the input signal. Framer 34 keeps UI stream 24 and input stream 33 in synchrony and encodes them into combined data stream 37 in accordance with the protocol of the communication means. FIG. 2C additionally shows converter 30 receiving output stream 54 from framer 34 to produce output signal 52 going out via output 53 to the external device. Generally, any stream described in this invention has digital values, which may be transported either by a single signal or by multiple signals. Communication means 35 translate combined data stream 37 into proper signaling format traveling on communication link 36 to computer 10 at port 38. Although being shown in the drawings, the external device, link 36, computer 10, and port 38 do not belong to the embodiment of the invention. For the I/O signals being analog, converter 30 at least performs as an analog-to-digital converter such as the encoder-decoder (codec). For the I/O signals being digital, the converter at most may be eliminated, so that the framer may directly synchronize and merge digital input signal 31 with UI stream 24 to produce combined data stream 37.

In order to implement wireless communication link, communication means 35 is a wireless transceiver which transmits/receives the electromagnetic signals forming link 36, while at port 38 there is a compatible wireless transceiver to receive/transmit the same signals. Two typical wireless transceivers are the infrared-light (IR), such as those used in standard IR devices, and the radio frequency (RF), such as those used in cordless telephones or in conventional RF transmitters and receivers.

Figure 3A:
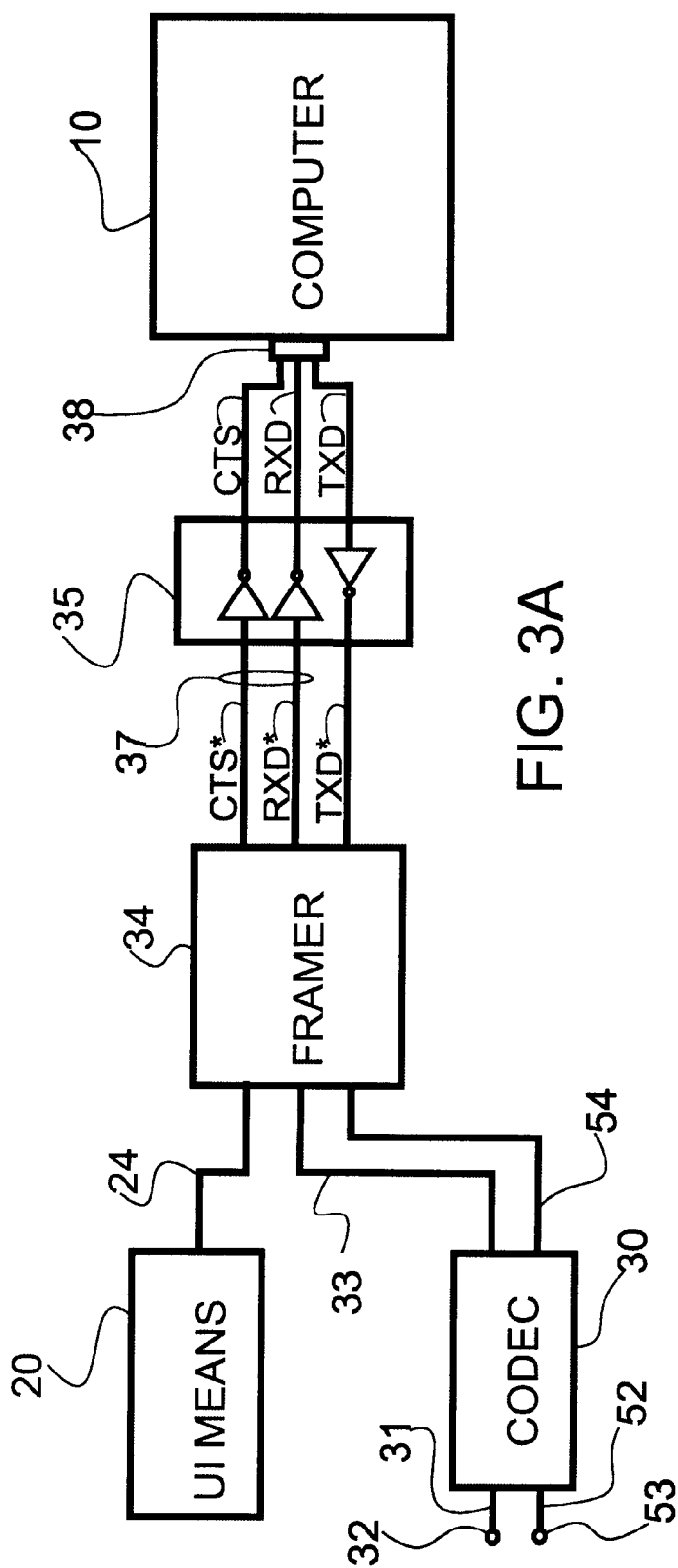
FIG. 3A shows one embodiment of the invention utilizing the RS-232 cable.
Figure 3B:
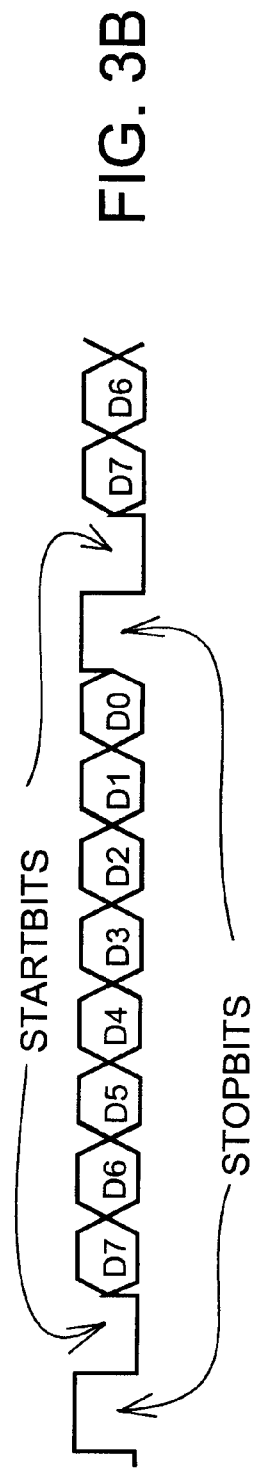
FIG. 3B shows one timing waveform of the RS-232 data format.

FIG. 3A illustrates one implementation of the embodiment of the invention that receives and transmits analog I/O signals while transferring data to/from the computer via the RS-232 cable. It utilizes all the elements shown in FIG. 2A and further includes the feature of receiving an output information sent from the computer via line TXD of the RS-232. Framer 34 serializes such output information to become signal 54, which is converted by converter 30 into output signal 52 going to output 53. Converter 30 is a codec, such as part TP3054 from National Semiconductor, 2900 Semiconductor Drive, P.O. Box 58090, Santa Clara, Calif. 95052-8090. Communication means 35 is an RS-232 transceiver, such as part MC145406 from Motorola, P.O. Box 20912, Phoenix, Aria. 85036-9938. In reference to FIG. 3A, UI stream 24 directly becomes signal CTS*, while digital stream 33 is transformed by framer 34 to become signal RXD*. Both signals CTS* and RXD* form the combined data stream 37, which is translated by transceiver 35 to become respectively the RS-232's CTS and RXD lines. While line RXD is specifically utilized to transport stream 33 because of its high data transfer rate, any RS-232's other input line, instead of CTS, may be chosen to transport stream 24. In order to be compatible with the serial format of the codec, the RS-232 protocol is preferably formatted with one start-bit, eight data-bits (D7 to D0), and one stop-bit, as depicted by FIG. 3B, and transmitted at 115.2 kbits/s.

Figure 4A:
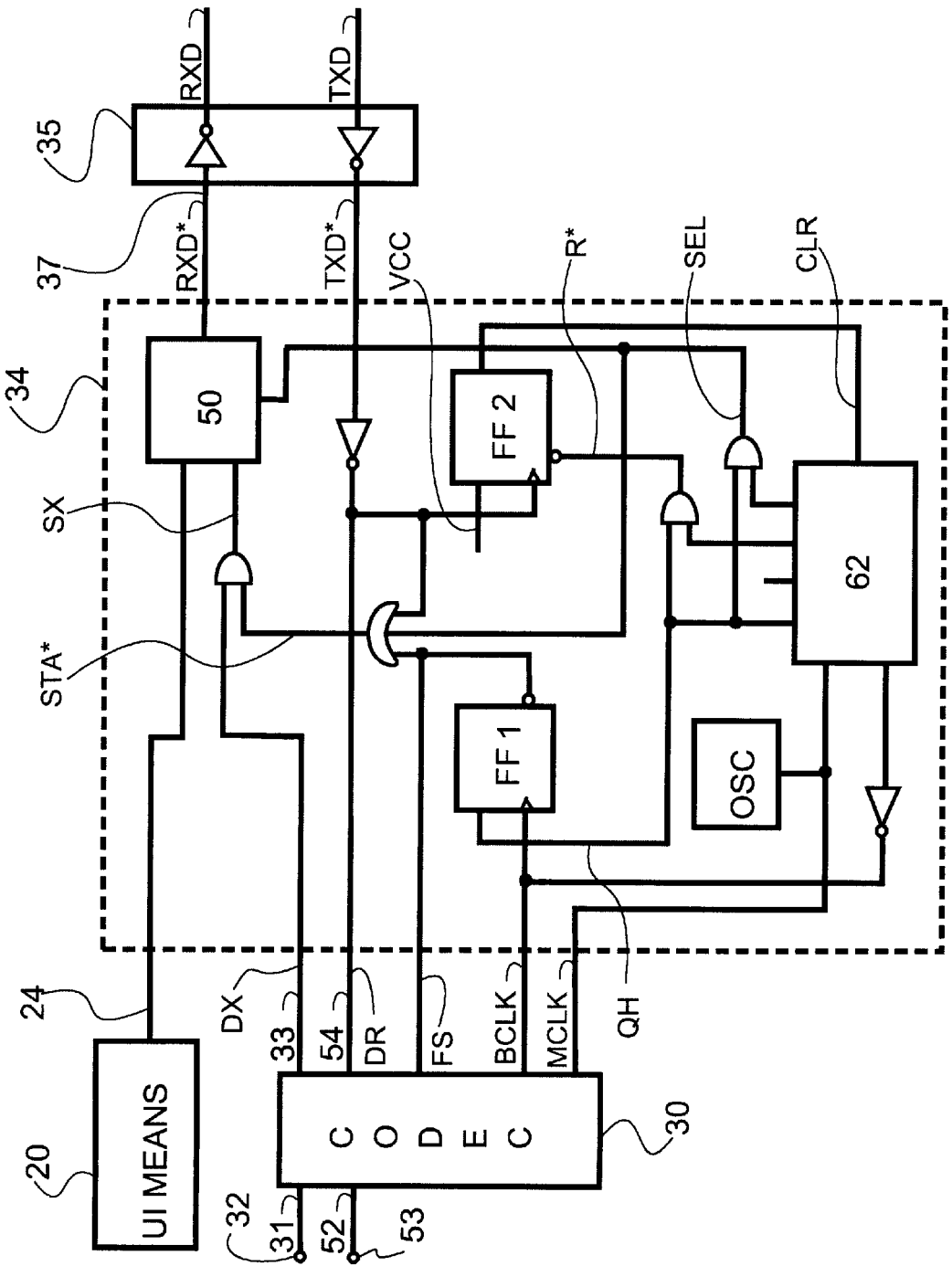
FIG. 4A shows one logic design of another embodiment of the invention.
Figure 4B:
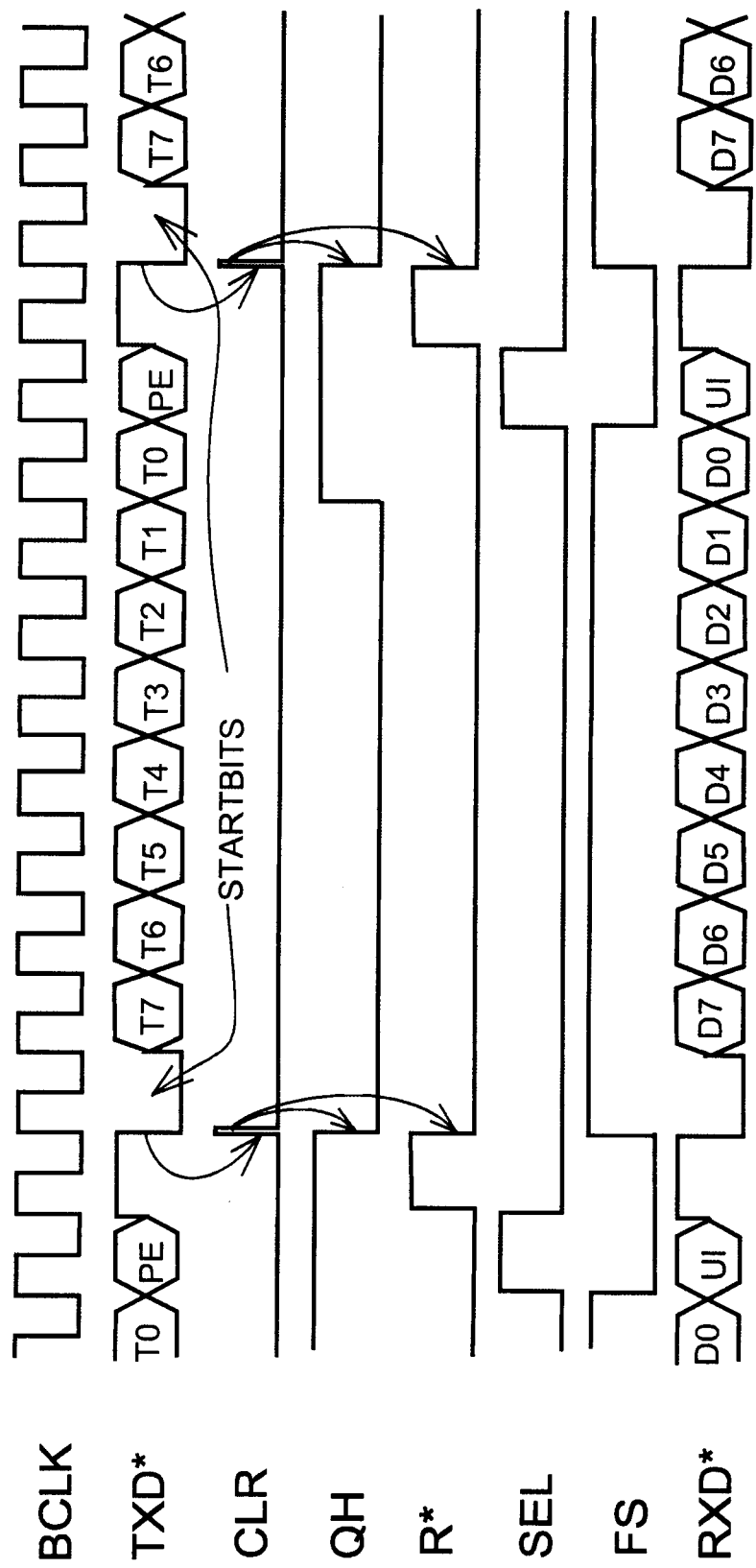
FIG. 4B shows the timing waveform of the critical signals involved in FIG. 4A.

In applications where the efficiency of the communication link is desired, such as in wireless communication, combined data stream 37 is encoded into a single signal transmitted by a single wire or electromagnetic wave. FIG. 4A depicts one embodiment of the invention in which framer 34 encodes data stream 37 into a single signal. In reference to FIG. 4A, the codec TP3054, in place of converter 30, converts output information 54, sent from the computer via line TXD, into output signal 52 entering output 53. Concurrently, the codec also converts input signal 31, delivered by input 32, into serial stream 33. In order to make stream 33 compatible with the RS-232's data format, a start-bit pulse provided by signal STA* is logically AND-ed with stream 33 to become digital input stream SX carrying information of the input signal. Since codec 30 converts output information 54 and input signal 31 simultaneously, their corresponding data streams traveling on the RS-232's data lines, TXD and RXD, are preferably synchronized for their timely transmission and reception by the computer. One logic implementation of the framer, as depicted in FIG. 4A, relies on the signal of line TXD to maintain the synchronization between the UI and input streams. The data lines TXD and RXD are programmed by the computer to have a data rate of 115.2 kbits/s and a frame format composed of eleven bits: one start-bit, eight data-bits, one parity-error-bit (PE-bit) and one stop-bit. In reference to FIGS. 4A and 4B, flip-flop FF2, utilizes signal CLR to re-synchronize clock generator 62 with the start-bit of signal TXD*. Signal CLR is kept low by signal R* during the transmission of each data frame of signal TXD*; otherwise, due to the high voltage VCC at FF2's input pin, it waits for being set high by the upcoming start-bit of signal TXD*. Once set, signal CLR restarts, and is immediately reset by the same, clock generator 62 providing bit-clock signal BCLK of the codec. Signal BCLK is divided by sixteen to become signal QH, which is latched into flip-flop FFI to provide the codec's frame-sync signal FS converting input signal 31 into serial stream 33 coming out of the codec's pin DX. Simultaneously, signal FS moves output information 54 serially into the codec, via pin DR, to be converted into output signal 52. Both UI stream 24 and input stream SX are synchronezed and encoded into a single signal RXD* by data selector 50 under control of signal SEL. The latter, formed by signals coming from clock generator 62, produces a string of positive pulses in sychrony with the PE-bit locations of signal RXD*, referred to as the UI-bit and denoted as "UI" in FIG. 4B. Data selector 50, normally selecting the input stream SX, otherwise samples UI stream 24 and stores its data into the UI-bit location of signal RXD*. Since UI stream 24 varies slowly compared to the pulsing of signal SEL, its information is conserved in, and subsequently can be recovered from, the UI-bits of signal RXD*. The UI-bit location on signal RXD* is not necessarily at the PE-bit. For instance, the least-significant data-bit (DO) location may be used instead. In such case, the pulses of signal SEL occur at the DO-bit time slots; consequently, the PE-bits, no longer needed, may be omitted entirely from signal RXD* to enhance the data transfer rate. In order to provide clocking signals, oscillator OSC of frequency around 1.8 MHz generates master clock MCLK running the codec. Clock generator 62 divides signal MCLK by sixteen to produce bit clock BCLK. The timing waveform for signals SEL, CLR, FS, QH, R*, TXD*, and RXD* are depicted in FIG. 4B, in relation to bit clock BCLK.

Figure 5:
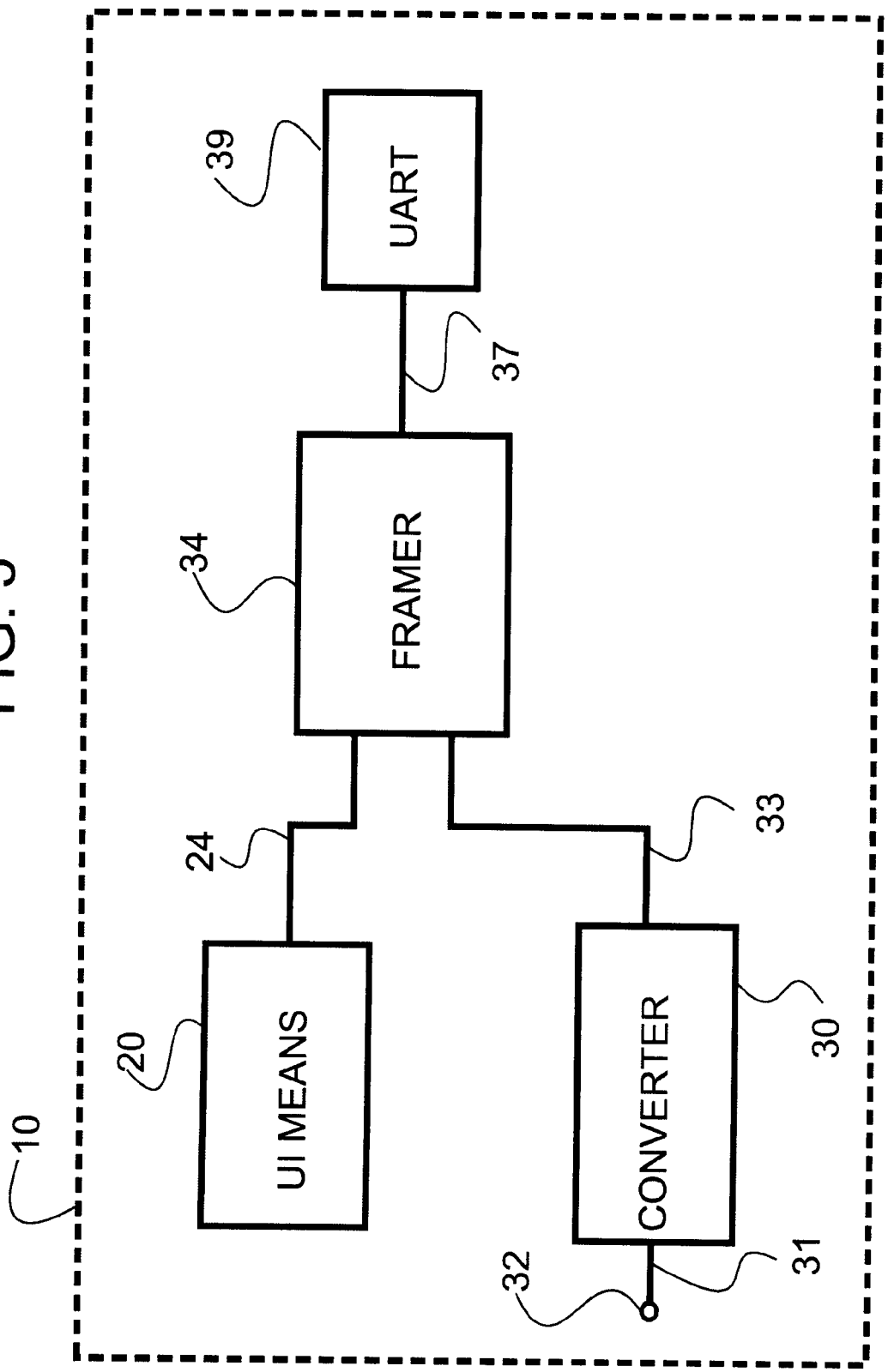
FIG. 5 shows the block diagram of one of the onboard embodiments of the invention.

Another embodiment of the invention provides an apparatus inside, or onboard, the computer. As illustrated in FIG. 5, the RS-232 implementation of the onboard embodiment does not need transceiver 35; framer 34 links directly to the universal asynchronous receiver/transmitter (UART) controller 39 existed inside computer 10.

Working in conjunction with each inventive apparatus, there exists a program method, executed by the computer, for sending output information to the apparatus, for receiving the combined data stream 37 in which a UI stream and an input stream are kept in synchrony and encoded, and for recovering therefrom the respective information of the UI stream and of the input signal. The program method comprises an initialization section, an interrupt service routine (ISR), and a data recovering routine. Specifically, for the inventive apparatus communicating with a personal computer (PC) via an RS-232 link, the three parts of the method are as follow.

The initialization section comprises the steps of:

setting up essential data buffers and their respective pointers;

initializing the communication control signals;

programming the communication mode;

installing the interrupt service routine;

loading initial data into the transmit-data register; and enabling the communication interrupt to transmit/receive data.

The interrupt service routine comprises a tightly written code for:

reading the communication status;

checking for the error conditions;

transmitting data from a transmit-data buffer;

monitoring to receive and store data in a receive-data buffer;

deriving the UI-bit associated with each receive-data byte; and storing the UI-bit into an UI-bit buffer.

Depending on the way the combined data stream 37 is formed, the step of deriving the UI-bit is done as follows. If stream 37 is sent via two separate signals, as shown in FIG. 3A, that step reads the level of line CTS representing the value of the UI-bit during each receive-data byte. If stream 37 is sent via one single signal, as shown in FIG. 4A, that step reads the parity error status, compares with the expected PE-bit of the receive-data byte, and derives the corresponding UI-bit. For example, corresponding to a receive-data byte=5D-hex (expected PE-bit is even), the UI-bit is 0 if an odd-parity error occurs otherwise 1.

The data recovering routine has the steps of:

recovering the input-signal byte from the data contained in the receive-data buffer;

storing it into the input-signal buffer;

reconstructing from the UI-bits each byte of the UI stream; and depositing it into the UI-buffer.

The reconstruction of each UI-byte takes into account the programmed data rate of the UART and the bit-pattern of each data frame associated with that UI-byte. For example, in reference to FIG. 4B, the UART is programmed with eleven bits at 115.2 kbits/s while the UI stream received at 1200 bits/s; hence, each UI-bit cell has an elapsed time corresponding to $115.2 \div (1.2*11) = 8.72$ received data-bytes. Therefore, each UI-bit must have the same bit-value for N consecutive receive-data bytes, where N is an integer near 8.72 with its fraction being carried forward to the following UI-bit. The UI-byte can be reconstructed based on the UI stream's format, described earlier, which consists of one start-bit, seven data-bits representing the UI-byte, and one stop-bit. Due to the asynchronous nature of the UI stream, the stop-bit may have the bit length N>8.72 before the occurrence of the start-bit of the next UI-byte.

For the apparatus that receives only input signals to be sent to the computer, the UART does not transmit data. Accordingly, the first two steps of the program method are modified so that the ISR will be invoked when its receive-data being available, rather than when its transmit-buffer is empty.

For the inventive apparatus connected to a computer by an RS-232 cable, its power can be solely drawn from the RS-232's output signals, such as the RTS, DTR, and TXD; hence, the apparatus needs no battery or external power supply.

Also, the IC technology, using the PLDs, the gate arrays, the ASICs, or the mixed-signal ICs, can integrate many elements of the apparatus into at least one IC device. For instance, a combination of the framer, the codec, the electronic part of the UI means, and the transceiver, can be packaged into at least one IC device. Alternatively, the logic of such combination can be implemented by a microprocessor, such as part DSP56xxx from Motorola.

The above-mentioned TP3054 codec, compresses/decompresses the I/O signals into data according to the simple mu-law; there are other known methods that do so more efficiently, such as the ADPCM in the communication field and the vector-quantization (VQ) in the speech processing field. Such methods can be implemented by a microprocessor to reduce significantly data traffic on the communication link.

The above implementation converts straightforwardly the analog I/O signals into/from the data streams sent to/from the computer. Other embodiments of the invention have the converter process the I/O signals completely before transferring their information to/from the computer along with the UI information, such as the case of dealing with the telephone I/O signals.

For the apparatus using the USB as the communication link, a USB controller, such as part CY7C6xxxx from Cypress Semiconductor, 3901 North First St., San Jose, Calif. 95134-1599, implements either only transceiver 35 or both framer 34 and communication means 35. More generally, a micro-controller or a microprocessor specialized in the USB protocol can be used to implement at least some electronic parts of the inventive apparatus.

Another aspect of the invention offers a communication method by which a computer, receiving a combined data stream associated with two sources of information, one from a UI means and another from an input signal, recovers from such data the respective information of the two sources. Such method comprises the three steps described earlier. Such method further transmits data onto the communication.

Although the present invention has been described in connection with the above-mentioned embodiments, it is not limited to their illustrated implementations. People skilled in the art can modify, enhance, and/or refine those implementations to achieve the spirit and cover the scope of the invention as defined in the appended claims.

I claim:

1. A user input apparatus operatively coupled to a computer via a communication means additionally receiving at least one input signal, comprising:

user input means for producing a user input stream;

input means for producing the at least one input signal;

converting means for receiving the at least one input signal and producing therefrom an input stream; and encoding means for synchronizing the user input stream with the input stream and encoding the same into a combined data stream transferable by the communication means.

2. The apparatus of claim 1 wherein the combined data stream is encoded into a single signal.

3. The apparatus of claim 1 wherein at least part of the apparatus is implemented by an integrated circuit device.

4. The apparatus of claim 1 wherein at least part of the apparatus is implemented by a microprocessor.

5. The apparatus of claim 4 further comprising means for compressing/decompressing the combined data stream, reducing the data traffic traveling on the communication means.

6. The apparatus of claim 1 wherein the apparatus resides in the computer.

7. The apparatus of claim 1 wherein the apparatus draws its power solely from communication signals traveling on the communication means.

8. The apparatus of claim 1 wherein the communication means is an RS-232 having at least two separate signal lines wherefrom the encoding means sends the user input stream and the input stream.

9. The apparatus of claim 1 wherein the communication means is a Universal Serial Bus.

10. The apparatus of claim 1 wherein the input means is an input transducer.

11. The apparatus of claim 1 wherein the user input means is an interface to an external user input device.

12. The apparatus of claim 1 further comprises means for receiving an output stream from the computer via the communication means and means for converting the output stream into at least one output signal.

13. The apparatus of claim 12 further comprises an output transducer converting the at least one output signal into output energy.

14. A programming method, executed by a computer communicatively coupled via a communication link to a user input means having means for synchronizing and encoding a user input stream and at least one additional input signal into a combined data stream, comprising the steps of:

initializing the communication link;

servicing a single resource service interrupt for receiving the combined data stream; and recovering from the combined data stream respective information of the user input means and of the at least one additional input signal.

15. The programming method of claim 14 further comprises transmitting, via the communication link, output information, the output information being received and converted by a converter residing in the user input means into at least one output signal.

16. An apparatus linked to a computer by a communication link, functioning as a user input device and additionally receiving at least one input signal, comprising:

a user input device producing a user input stream;

an input port receiving at least one input signal;

a converter receiving the at least one input signal for producing an input stream; and a framer synchronizing the user input stream with the input stream and encoding the same into a combined data stream transferable by the communication link.

17. The apparatus of claim 16 further comprises means for receiving an output stream from the computer via the communication link and means for converting the output stream into at least one output signal.

18. The apparatus of claim 16 wherein the converter further comprises an output port wherein the framer further receives an output stream from the computer via the communication link, the output stream being further received and converted by the converter into at least one output signal going to the output port.

19. A method by which a computer receives via a communication link a combined data stream containing synchronized and encoded information of a user input means and of at least one additional input signal, said method comprising the steps of:

initializing the communication link;

servicing a single resource service interrupt for receiving the combined data stream; and recovering from the combined data stream respective information of the user input means and of the at least one additional input signal.

20. The method of claim 19 further comprises transmitting output information to the communication link, the output information being received and converted by a converter residing in the user input means into at least one output signal.

21. A user input apparatus operatively coupled to a computer via a communication link receiving user input signals and additionally at least one digital input signal, comprising:

a user input device for producing a user input stream;

an input port for producing the at least one digital input signal; and a framer for keeping the user input stream and the at least one digital input signal in synchrony and encoding the same into a combined data stream transferable to the computer by the communication link.

22. The apparatus of claim 21 wherein the framer further receives output information from the computer to provide at least one output signal.

23. The apparatus of claim 22 further comprises an output transducer converting the at least one output signal into output energy.

24. The apparatus of claim 22 wherein the apparatus is further coupled to an external device, the external device providing the at least one digital input signal and receiving the at least one output signal.

25. The apparatus of claim 21 wherein the input port receives the at least one digital input signal from an external device.

\* \* \* \* \*